US007401623B2

(12) United States Patent
Roe et al.

(10) Patent No.: US 7,401,623 B2
(45) Date of Patent: Jul. 22, 2008

(54) DOUBLE-ACTING VALVE UNIT

(75) Inventors: Phillip S. Roe, Eldora, IA (US); Robert Clayton Emmert, Waverly, IA (US)

(73) Assignee: Deere & Company, Moline, IL (US)

( * ) Notice: Subject to any disclaimer, the term of this patent is extended or adjusted under 35 U.S.C. 154(b) by 272 days.

(21) Appl. No.: 11/336,529

(22) Filed: Jan. 20, 2006

(65) Prior Publication Data

US 2007/0169822 A1 Jul. 26, 2007

(51) Int. Cl.
*F16K 17/18* (2006.01)

(52) U.S. Cl. ............... 137/493.9; 137/493; 137/565.15; 417/250; 417/253

(58) Field of Classification Search ................. 137/493, 137/493.9, 565.15, 565.17, 565.3, 565.34, 137/565.29, 536, 543.23, 56.29, 565.345; 417/287, 250, 253; 60/413
See application file for complete search history.

(56) References Cited

U.S. PATENT DOCUMENTS 1,798,536 A * 3/1931 Hofman ...................... 137/493
1,843,449 A * 2/1932 Gangler ..................... 53/133.4
2,565,374 A * 8/1951 Kitchel ....................... 417/253
4,503,882 A * 3/1985 Brunner ...................... 137/493
5,172,716 A * 12/1992 Paptzun ................ 137/115.05

* cited by examiner

*Primary Examiner*—Stephen M Hepperle

(57) ABSTRACT

A hydraulic system includes a charge pump which supplies fluid to variable displacement main pump, a fluid reservoir and valve unit. The valve unit includes a hollow housing having a first end communicated with the reservoir and a second end communicated with the charge pump and the main pump. A housing valve land member is located between the first and second ends. A valve member is movably mounted in the housing. The valve member has a valve disk attached to first and second valve stems which project from opposite sides of the valve disk. The valve disk has a central position wherein the valve disk is received by the ring. The valve stems are slidably supported by stem support members at opposite ends of the housing. A hollow sleeve projects from an end of the valve unit. A spring is mounted in the sleeve and is engagable with an end of one of the valve stems and is biased to urge the valve member away from the sleeve.

8 Claims, 2 Drawing Sheets

DOUBLE-ACTING VALVE UNIT

BACKGROUND

The present invention relates to a double acting valve unit for a hydraulic system.

A known production tractor hydraulic system includes a charge pump which supplies hydraulic fluid to a variable displacement piston pump and to a clean oil reservoir. It would be desirable to maintain at least a certain desired minimum charge pressure at the inlet to the piston pump, and to allow the free flow of oil from the clean oil reservoir to the piston pump during conditions when the piston pump requires a high volume of oil, such as when the piston pump is supplying oil to a single acting cylinders or a hitch cylinder during hitch operation.

Previously, this has required two separate valve devices, such as a conventional check valve with a parallel bypass orifice. A simpler, more compact valve unit is desired.

SUMMARY

Accordingly, an object of this invention is to provide a valve device which increases the charge pressure supplied to the piston pump, and to allow the free flow of oil from the clean oil reservoir to the piston pump in a hydraulic system which includes a charge pump which supplies hydraulic fluid to a variable displacement piston pump and to a clean oil reservoir.

This and other objects are achieved by the present invention, wherein a valve unit is provided for a hydraulic system having a charge pump which supplies fluid to variable displacement main pump and to a fluid reservoir. The valve unit includes a hollow housing with a first end communicated with the reservoir and a second end communicated with the charge pump and the main pump. A housing valve land member is located between the first and second ends. A valve member is movably mounted in the housing, and has a valve disk attached to first and second valve stems which project from opposite sides of the valve disk. The valve disk has a central position wherein the valve disk is received by the land member. The valve stems are slidably supported by end plates in the ends of the housing. Each end plate has fluid flow openings extending therethrough. A hollow sleeve projects from one of the end plates. A spring is mounted in the sleeve, engages an end of one of the valve stems and is biased to urge the valve member towards the other end plate. The valve unit operates to maintain at least a desired charge pressure at an inlet of the main pump. The valve disk, in response to fluid pressure, is movable out of said central position to displaced positions on opposite sides of the land member.

The valve unit maintains a minimum charge pressure supplied to the piston pump, and to allow the free flow of oil from the clean oil reservoir to the piston pump in a hydraulic system which includes a charge pump which supplies hydraulic fluid to a variable displacement piston pump and to a clean oil reservoir.

DETAILED DESCRIPTION

Figure 1:
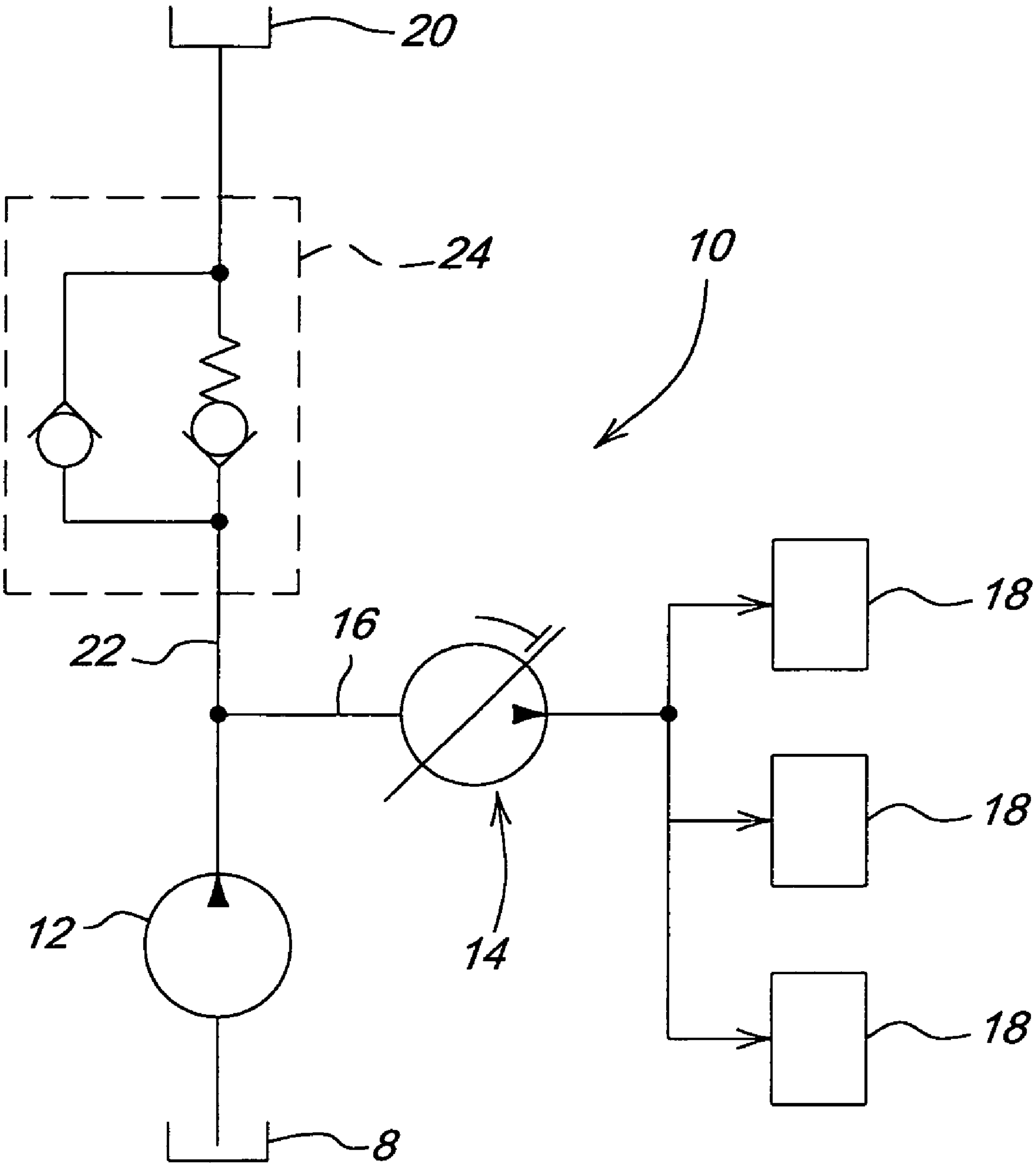
FIG. 1 is a schematic circuit diagram of a hydraulic system including the present invention.

Referring to FIG. 1, a vehicle hydraulic system 10 includes an engine driven charge pump 12 which supplies hydraulic fluid from a reservoir 8 to an inlet of a conventional engine driven variable displacement main hydraulic pump 14 via supply line 16. Pump 14 supplies pressurized hydraulic fluid to one or more vehicle hydraulic functions 18, such as vehicle or implement working cylinders or a hitch cylinder of a vehicle hitch mechanism (not shown). The hydraulic system 10 also includes a clean oil reservoir 20 which is connected to an outlet of charge pump 12 via line 22 and a double acting check valve unit 24.

Figure 2:
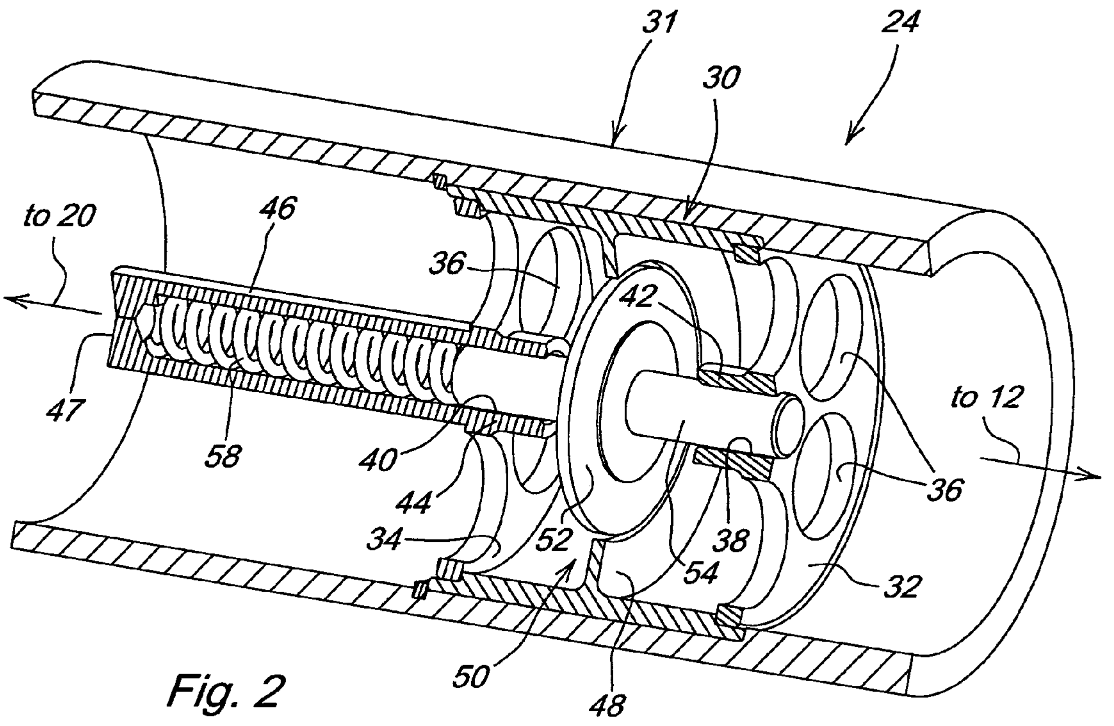
FIG. 2 is a perspective partial cut-away view of the double acting valve unit of the present invention.

As best seen in FIG. 2, check valve unit 24 includes a hollow valve housing 30 received in a fluid conduit 31, both of which are preferably cylindrical. First and second end plates or stem support members 32 and 34 are fixedly mounted in opposite ends of housing 30. Each stem support member 32, 34 includes a plurality of openings 36 through which hydraulic fluid can flow. Each stem support member 32, 34 includes a corresponding central valve bore 38, 40. Stem support member 32 includes a central valve support sleeve 42 which projects towards the other end plate 34. Stem support member 34 includes a central valve support sleeve 44 which projects towards the other end plate 32, and a central spring receiving sleeve 46 which extends away from stem support member 32.

Check valve unit 24 also includes a housing valve land or throat member 48 which forms a hollow annular ring located between stem support members 32 and 34. A valve member 50 is movable in the housing 30. Valve member 50 includes a solid central disk 52 and a pair of central valve stems 54 and 56 which project axially from opposite sides of the disk 52. Valve stem 54 is slidably received by sleeve 42 and bore 38. Valve stem 56 is slidably received by sleeve 44 and bore 40. A spring 58 is mounted in sleeve 46 between the end 47 of sleeve 46 and the end 60 of valve stem 56. Disk 52 is slidably and loosely received by valve land 48. The fit between disk 52 and land 48 is preferably loose so that some leakage is permitted and so that valve "sticking" is prevented.

In operation, disk 52 and land 48 limit fluid flow through valve unit 24 from charge pump 12 to reservoir 20 unless the pressure on the charge pump side exceeds a certain desired pressure established by the force of spring 58. This maintains at least this minimum desired pressure at the inlet of pump 14. When the charge pressure exceeds this desired pressure, valve disk 52 moves to the left viewing FIG. 2, thus permitting fluid flow between valve disk 52 and land 48, and thus allowing fluid to flow through valve unit 24 to the reservoir 20.

When the piston pump 14 requires a high volume of fluid, the pressure on the left side of disk 52 will be higher than the pressure on the right side, and this pressure differential will move disk 52 to the right viewing FIG. 2 and away from land 48. This will permit fluid to freely flow from reservoir 20 to the inlet of pump 14.

This 2-way check valve unit 24 thus has only one moving part—the main spool or valve member 50. In the normal situation when charge pump 12 is supplying charge flow to piston pump 14, the fluid acts on the valve member 50 and pushes it against the spring 58, which opposes opening of the valve unit 24 and ultimately builds resistance to flow and increases the charge pressure. During conditions where the piston pump 14 must supply a high volume of fluid (i.e. hitch raises or single acting cylinder take out) fluid is pulled in the reverse direction through valve unit 24 by the piston pump 14, and the valve member 50 moves away from spring 58 and land

48, thus allowing the free flow of oil thru stem support member 34, around valve disk 52 and through stem support member 32.

The result is a valve which allows for passage of high flow rates (up to 3.85 l/s), and which has a compact, in-line design which can fit inside existing tubing. This valve maintains a minimum level of charge pressure on the piston pump 14 throughout an operating speed range of the engine (not shown), and allows for free flow of oil in reverse direction when piston pump 14 demands more oil than charge pump 12 can deliver.

Figure 3:
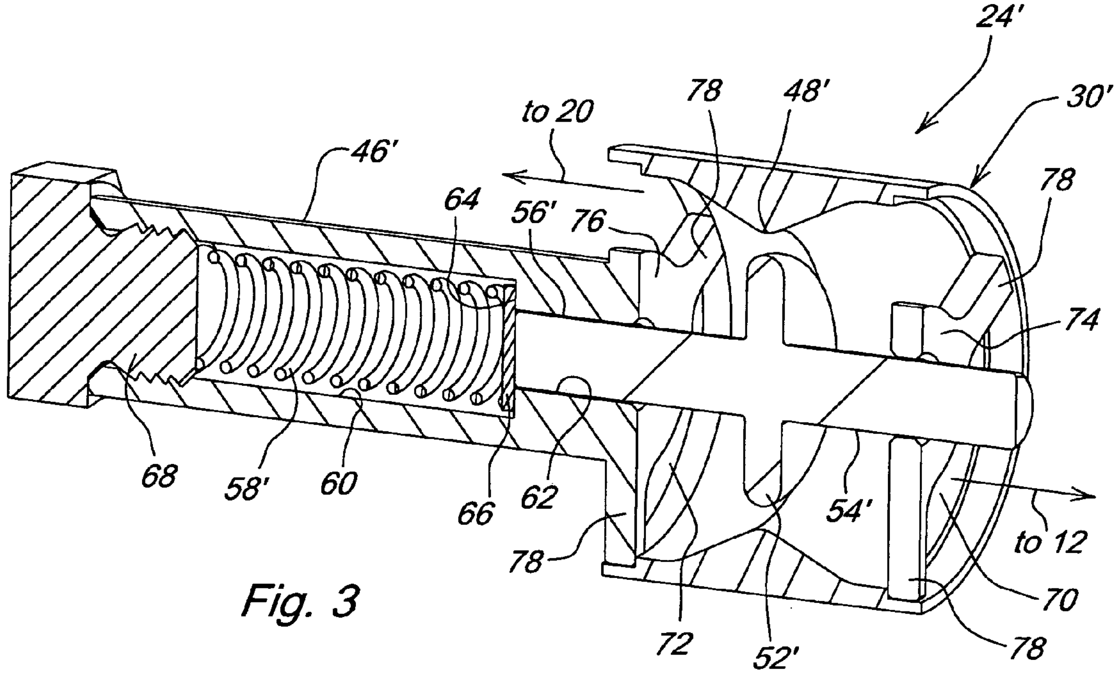
FIG. 3 is a perspective partial cut-away view of an alternate embodiment of the double acting valve unit of the present invention.

Referring now to FIG. 3, the valve unit 24' is similar to the valve unit 24 of FIG. 2. However, in valve unit 24' the land 48' is integral with the housing 30' and is formed by a portion of the housing 30' having a reduced inner diameter, such as a throat. Also, the sleeve 46' forms larger and smaller diameter bores 60 and 62 which are separated by an annular shoulder 64. A solid disk 66 is held against shoulder 64 by spring 58' and is engagable with the end of valve stem 56'. A threaded stop member 68 is screwed into the end of sleeve 46' in order to adjust the force of spring 58'. The shoulder 64 and the stop member 68 apply a pre-load to the spring 58' so that a minimum pressure is required to move valve disk 52' to open communication from pump 12 to clean oil reservoir 20. First and second end members 70 and 72 are mounted in opposite ends of the housing 30'. Each end member 70 and 72 includes a hollow central hub 74, 76 and web members or spokes 78 which project radially from the hubs 74 and 76 to an inner surface of the housing 30'. The central hubs 74 and 76 slidably support corresponding ones of the stems 56' and 54'.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A valve unit for a hydraulic system, the valve unit comprising:

a hollow housing having a first end for communicating with a reservoir and a second end for communicating with a pump;

a housing valve land member between the first and second ends;

a valve member movably mounted in the housing, the valve member having a central position wherein the valve member is received by the land member thereby restricting fluid flow therebetween;

a valve spring biased to urge the valve member away from the first end of the housing, the valve member, in response to fluid pressure, being movable out of said central position to displaced positions on opposite sides of the land member;

a hollow sleeve projecting from the housing, the sleeve forming a larger diameter bore and a smaller diameter bore separated by an annular shoulder, the spring being received by the larger diameter bore; and a stop disk mounted in the larger diameter bore between the spring and the shoulder, the stop disk being engagable with a valve stem which projects from the valve member.

2. The valve unit of claim 1, further comprising:

first and second valve stems projecting from a central valve disk;

a first stem support member mounted at the first end of the housing; and a second stem support member mounted at the second end of the housing, each stem support member having a central bore and fluid flow openings, and each valve stem being slidably received by a corresponding one of the central bores.

3. The valve unit of claim 1, wherein:

the valve unit operates to maintain at least a desired pressure at its second end.

4. The valve unit of claim 1, wherein:

the valve land member comprises an annular ring member.

5. The valve unit of claim 1, wherein:

the valve land member comprises a reduced diameter throat portion of the housing.

6. A valve unit for a hydraulic system, the valve unit comprising:

a hollow tube having a first end for communicating with a reservoir and a second end for communicating with a pump;

an annular ring member formed in the tube between the first and second ends;

a first stem support member mounted in the first end of the housing;

a second stem support member mounted in the second end of the housing, each end stem support member having fluid flow openings extending therethrough;

a valve member movably mounted in the housing, the valve member having a a valve disk attached to first and second valve stems which project from opposite sides of the valve disk, the valve disk having a central position wherein the valve disk is received by the ring, the valve member, in response to fluid pressure, being movable out of said central position to displaced positions on opposite sides of the ring member, each valve stem being slidably received by a corresponding one of the stem support members;

a hollow sleeve projecting from the first end of the housing; and a spring mounted in the sleeve and engagable with an end of one of the valve stems and biased to urge the valve member towards the second stem support member.

7. The valve unit of claim 6, wherein:

the valve unit operates to maintain at least a desired pressure at its second end.

8. The valve unit of claim 6, wherein:

each stem support member has a central bore extending therethrough, and each valve stem is slidably received by a corresponding one of the central bores.

* * * * *